(12) United States Patent　　(10) Patent No.:　US 12,654,517 B2

Ginnard et al.　　(45) Date of Patent: 　Jun. 16, 2026

(54) VEHICLE QUARTER-PANEL WINDOW ASSEMBLY

(71) Applicant: Rivian IP Holdings, LLC, Plymouth, MI (US)

(72) Inventors: Mark Edward Ginnard, Irvine, CA (US); Joseph Brown, Northville, MI (US); Jeremy Peter Green, Wiltshire (GB)

(73) Assignee: Rivian IP Holdings, LLC, Plymouth, MI (US)

( * ) Notice: Subject to any disclaimer, the term of this patent is extended or adjusted under 35 U.S.C. 154(b) by 619 days.

(21) Appl. No.: 18/083,843

(22) Filed: Dec. 19, 2022

(65) Prior Publication Data

US 2024/0200375 A1　　Jun. 20, 2024

(51) Int. Cl.
B60J 1/14　　　(2006.01)
B60J 1/08　　　(2006.01)
(Continued)

(52) U.S. Cl.
CPC ................ B60J 1/14 (2013.01); B60J 1/085 (2013.01); E05C 17/52 (2013.01); E05D 5/062 (2013.01);
(Continued)

(58) Field of Classification Search
CPC ... B60J 1/085; B60J 1/14; E05C 17/04; E05C 17/52; E05C 17/48; E05C 17/08;
(Continued)

(56) References Cited

U.S. PATENT DOCUMENTS 1,078,703 A * 11/1913 Soss ........................ E05D 5/062
16/270
2,132,266 A * 10/1938 Lefevre ................... E05D 3/022
16/361
(Continued)

FOREIGN PATENT DOCUMENTS

DE　　　1584006 A1 * 1/1970
DE　　19821490 C1 * 6/1999 ................ B60J 1/14
(Continued)

OTHER PUBLICATIONS

Chrysler (FR 2204513 A), EPO translation (Year: 1974).*
(Continued)

*Primary Examiner* — Amy R Weisberg
*Assistant Examiner* — Wenwei Zhuo
(74) *Attorney, Agent, or Firm* — HG LAW LLP

(57)　　　　ABSTRACT

Particular embodiments may provide a vehicle window assembly that includes a window pane, a latch, and a mount. The window pane is, in some embodiments, moveable to a closed position, a vented position, and an open position. The latch is, in some embodiments, coupled to a first edge of the window pane. In some embodiments, the mount is rotatably coupled to a second edge of the window pane. The mount and window pane are, in some embodiments, relatively rotatable by at least 45 degrees. In the open position, the mount and the window pane are relatively rotatable to a first angle of at least 45 degrees; in the vented position, the latch is configured to hold the window at a second angle less than 45 degrees; and in the closed position, the latch is configured to hold the window pane against a window seal.

20 Claims, 7 Drawing Sheets

(51) Int. Cl.

| | | |
|---|---|---|
| *E05C 17/52* | (2006.01) | |
| *E05D 5/06* | (2006.01) | |
| *E05D 7/12* | (2006.01) | |
| *E05C 17/08* | (2006.01) | |
| *E05D 7/10* | (2006.01) | |

(52) U.S. Cl.

CPC .............. *E05D 7/121* (2013.01); *E05C 17/08* (2013.01); *E05D 2005/067* (2013.01); *E05D 7/1044* (2013.01); *E05Y 2800/10* (2013.01); *E05Y 2800/75* (2013.01); *E05Y 2900/55* (2013.01)

(58) Field of Classification Search

CPC ..... E05D 2005/067; E05D 5/062; E05D 7/10; E05D 7/1005; E05D 7/1044; E05D 7/121; E05D 2007/126; E05D 1/06; E05D 7/1077; E05Y 2900/55; E05Y 2800/75

USPC ...... 296/146.16, 146.15, 148, 96.11; 49/394, 49/465, 463

See application file for complete search history.

(56) References Cited

U.S. PATENT DOCUMENTS

| | | | | | |
|---|---|---|---|---|---|
| 3,711,893 | A | * | 1/1973 | King ............................ | B60J 1/14 |
| | | | | | 16/383 |
| 4,923,232 | A | * | 5/1990 | Kawagoe ................. | E05C 17/32 |
| | | | | | 292/263 |
| 5,203,113 | A | * | 4/1993 | Yagi ......................... | E05F 15/63 |
| | | | | | 49/357 |
| 5,438,801 | A | * | 8/1995 | Ishihara ................... | E05F 15/63 |
| | | | | | 49/357 |
| 5,901,500 | A | * | 5/1999 | Tsuda ....................... | E05F 15/63 |
| | | | | | 49/340 |
| 5,966,871 | A | * | 10/1999 | Tsuda ....................... | E05F 15/63 |
| | | | | | 49/324 |
| 6,010,180 | A | * | 1/2000 | Bureau ..................... | E05D 1/06 |
| | | | | | 296/146.16 |
| 2002/0111410 | A1 | * | 8/2002 | Lewno ................... | B60J 1/1884 |
| | | | | | 524/451 |
| 2002/0158490 | A1 | * | 10/2002 | Hutzel ..................... | B60J 1/085 |
| | | | | | 296/193.04 |
| 2005/0193633 | A1 | * | 9/2005 | Scheer ................... | E05D 5/0246 |
| | | | | | 49/398 |
| 2005/0193634 | A1 | * | 9/2005 | Scheer ..................... | E05D 5/062 |
| | | | | | 49/398 |
| 2005/0280292 | A1 | * | 12/2005 | Reitzloff ............... | B60J 7/1291 |
| | | | | | 296/219 |
| 2006/0225361 | A1 | * | 10/2006 | Scheer ..................... | E05D 11/04 |
| | | | | | 49/397 |
| 2008/0156415 | A1 | * | 7/2008 | Repp .......................... | B60J 1/14 |
| | | | | | 49/506 |
| 2014/0047772 | A1 | * | 2/2014 | Hulst ......................... | B60J 1/14 |
| | | | | | 49/394 |
| 2019/0241053 | A1 | * | 8/2019 | Desai .......................... | B60J 1/14 |
| 2025/0065695 | A1 | * | 2/2025 | Green ...................... | B60J 1/085 |

FOREIGN PATENT DOCUMENTS

| | | | | | |
|---|---|---|---|---|---|
| DE | 19653988 | C2 | * | 12/2002 | |
| EP | 1329347 | A1 | * | 7/2003 | ............... B60J 1/14 |
| FR | 2204513 | A | * | 6/1974 | ............... B60J 1/14 |
| GB | 1254838 | A | * | 11/1971 | |
| KR | 19980041699 | U | * | 9/1998 | |
| KR | 100188593 | B1 | * | 6/1999 | |
| KR | 20080048280 | A | * | 6/2008 | |

OTHER PUBLICATIONS

Kolling (EP 1329347 A1), machine translation (Year: 2003).*
Shuker (DE 19653988 C2), machine translation (Year: 2002).*
Sittmann et al. (DE 1584006 A1), EPO translation (Year: 1970).*

* cited by examiner

VEHICLE QUARTER-PANEL WINDOW ASSEMBLY

INTRODUCTION

Sports utility vehicles (SUVs) typically include a window(s) in the rear of the vehicle that supplements light ingress from the windshield and door windows. Positioned in the rear quarter-panel of the vehicle, the supplemental windows are sometimes referred to as "rear quarter-panel windows." In some vehicles, the rear quarter-panel is a smaller panel (due, for example, to the position of the panel above a rear wheel of the vehicle) and, consequently, a rear quarter-panel window is smaller than the windshield and door windows.

BRIEF SUMMARY

Embodiments of the present invention are directed to rear quarter-panel window assemblies and vehicles incorporating quarter-panel window assemblies. The rear quarter-panel window assemblies include a window pane, a window seal, a latch, and a mount. The latch is coupled to an edge of the window pane and allows the window pane to be releasably coupled to a vehicle. The mount is coupled to a different edge of the window pane and allows rotation of the window pane from a closed position to an angle of at least 45 degrees from the closed position. In some embodiments, the vehicle rear quarter-panel window assembly provides for multiple positions for the window pane, including closed, vented, and open. In the open position, the mount and the window pane are relatively rotatable to a first angle, the first angle at least 45 degrees. In the vented position, the latch is configured to hold the window pane at a second angle less than 45 degrees. In the closed position, the latch is configured to hold the window pane against the window seal. By providing an opening of at least 45 degrees, the rear quarter-panel window assembly can allow access to the interior of the vehicle through the quarter-panel, thereby avoiding the need to access through a rear door or rear door window of the vehicle. This may be particularly useful when carrying equipment at the rear of the vehicle, such as a bike on a bike rack; in this example, access through the rear quarter-panel window can allow for item retrieval without removing the bike from the rear of the vehicle. In some embodiments, the window pane is removable from the rear quarter-panel assembly thereby allowing unrestricted access to an interior of the vehicle through the rear quarter-panel and allowing for airflow through the vehicle while the vehicle is in motion. In such embodiments, the mount of the rear quarter-panel window assembly can be used for other purposes. For example, the mount can be used to attach equipment, such as racks to dry clothing (e.g., towels, wet-suits) or powered equipment (e.g., lights, televisions).

In some embodiments, a vehicle window assembly includes a window pane, a window seal, a latch, and a mount. The latch is, in some embodiments, coupled to a first edge of the window pane. In some embodiments, the mount is rotatably coupled to a second edge of the window pane. The mount and window pane are, in some embodiments, relatively rotatable by at least 45 degrees.

The latch is configured, in some embodiments, to hold the window pane in a closed position and a vented position. In the vented position, the mount and the window pane may be relatively rotated to an angle less than 45 degrees. In some embodiments, the latch may, for venting, be configured to hold the window pane at an angle less than 45 degrees and further configured to hold the window pane at a different angle also less than 45 degrees.

In some embodiments, the mount is configured to removably couple to a vehicle. In some embodiments, the mount is separable into a first component attachable to the window pane and a second component attachable to a vehicle. In some embodiments, the mount is configured to decouple from the vehicle by decoupling the first component and the second component. In some embodiments with a first and second component, the second component includes a power connection. The mount includes, in some embodiments, a gooseneck hinge.

In some embodiments, the vehicle window assembly is configured to occlude a quarter-panel opening. The window pane occupies, in some embodiments, an area less than 0.5 square meters.

In some embodiments, a vehicle includes a quarter-panel opening, a window pane selectively covering the quarter-panel opening, a latch, and a mount. In some embodiments, the latch includes a first latch component (the first latch component which may be coupled to a first edge of the window pane) and a second latch component (which may be coupled to a first edge of the quarter-panel opening). The latch, in some embodiments, selectively couples the window pane to the vehicle. In some embodiments, the mount rotatably couples to a second edge of the window pane and to a second edge of the quarter-panel opening. The mount may be coupled to the vehicle and the window pane so that the window pane is rotatable relative to the vehicle by at least 45 degrees.

In some embodiments of the vehicle, the mount and the latch couple the window pane to the vehicle in a closed position and a vented position. In the vented position, the latch may hold the window pane at an angle (such as an angle less than 45 degrees) to the vehicle.

In some embodiments, the mount is removably coupled to the vehicle. Some embodiments of the mount are separable into a first mount component attachable to the window pane and a second mount component attachable to the vehicle. In some embodiments with first and second mount components, the mount is configured to decouple from the vehicle by decoupling the first mount component and the second mount component. In some embodiments with first and second mount components, the second component is configured to couple with a third mount component attached to a vehicle accessory. In some embodiments with first and second mount components, the second mount component includes a power connection. In some embodiments with first and second mount components, the second component is flush with a body of the vehicle when the window pane is removed.

In some embodiments of the vehicle, the quarter-panel opening is positioned above a rear wheel of the vehicle.

In some embodiments, a vehicle includes a quarter-panel opening, a window pane, a mount, and a power connection in the mount. In some embodiments, the window pane selectively covers the quarter-panel opening. In some embodiments, the mount couples the window pane to the vehicle so that the window pane is rotatable relative to the vehicle and removable from the vehicle.

In some embodiments of the vehicle, the window pane is moveable to a closed position, a vented position, and an open position. In the vented position, the window pane may be held at an angle to the vehicle of less than 45 degrees. In the open position, the window pane may be rotated at an angle to the vehicle of at least 45 degrees.

In some embodiments of the vehicle, the mount is separable into a first component attached to the window pane and a second component attached to the vehicle. In such embodiments, the mount may be configured to decouple from the vehicle by decoupling the first component and the second component. The second component can include the power connection.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
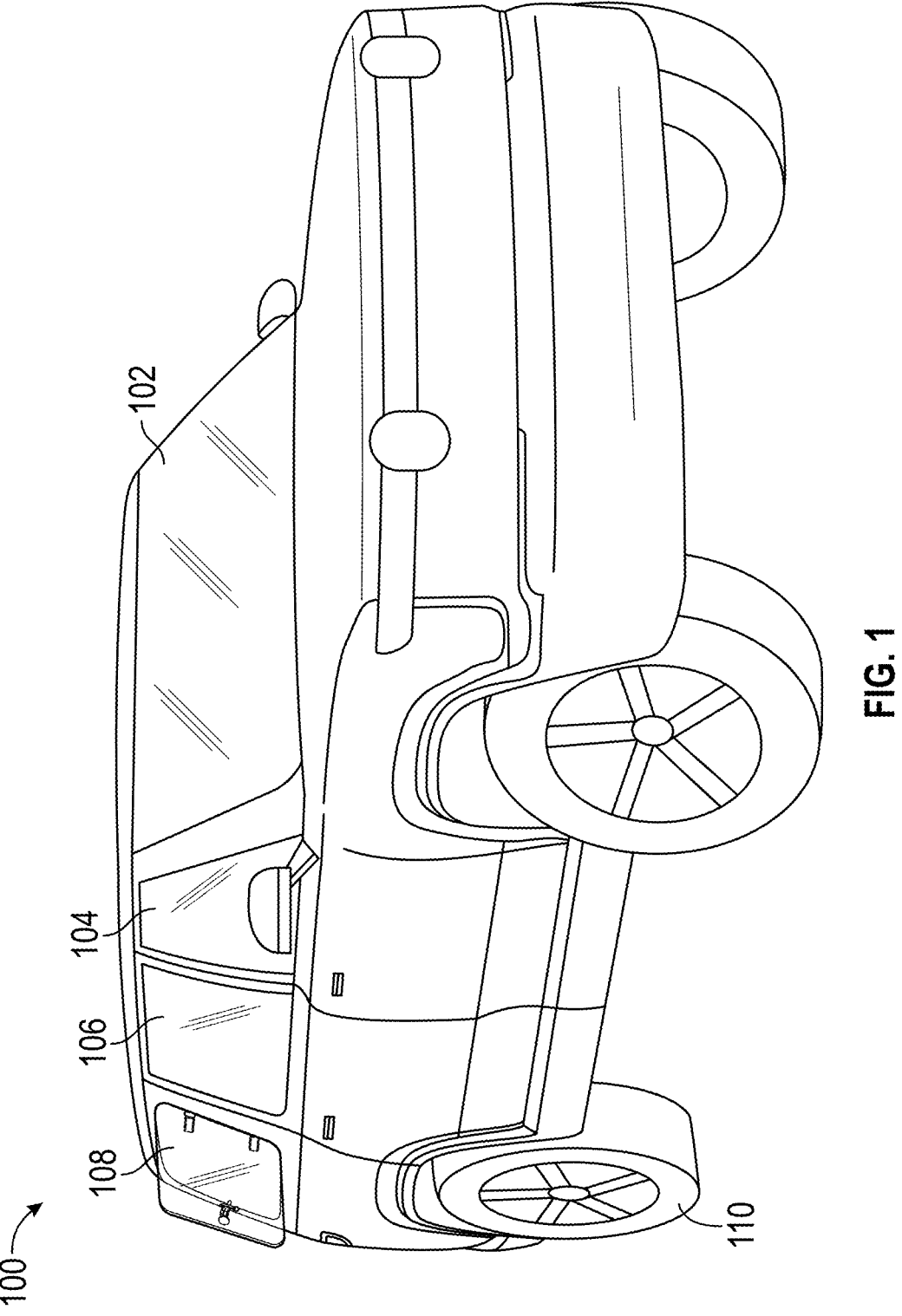
FIG. 1 illustrates an example vehicle with a rear quarter-panel assembly.

FIG. 1 illustrates an example vehicle 100 with windshield 102, front passenger-side window 104, rear passenger-side window 106, and passenger-side quarter-panel window 108. Vehicle 100 may also include a rear window (not shown), a front driver-side window (not shown), a rear driver-side window (not shown), and a driver-side quarter-panel window (not shown). As illustrated in FIG. 1, quarter-panel window 108 is opened at least 45 degrees. Vehicle 100 thereby allows access to the rear of the vehicle without necessitating opening of a rear door of the vehicle. For example, a user of vehicle 100 may have attached items to the rear of the vehicle (for example, a bike rack, a trailer, etc.) that reduces the user's ability to conveniently access the rear of the vehicle through the rear door. By way of another non-limiting example, a rear of the vehicle may be full or near-full, but a user desires an item that is positioned near a quarter-panel window and/or desires to add more items to the rear; access through the rear door may require inconveniently removing items just to access other items or add a new item and then replacing the removed items, but access through the quarter-panel window greatly simplifies the user's ability to retrieve the item and/or add an additional item.

As shown in FIG. 1, rear quarter-panel window 108 is positioned between the rear most door and the end of the vehicle, over rear wheel 110 of vehicle 100. Space above the rear wheel is limited and thus typically smaller than the available space in a door (e.g., the door with front passenger-side window 104, the door with rear passenger-side window 106). For that reason, rear quarter-panel windows are typically smaller than door windows and unable to roll down to fully open (due to the space occupied by the rear wheel). Embodiments herein provide a fully opening quarter-panel window. However, the embodiments described herein are not limited to quarter-panel windows and can be used in any area of a vehicle. Although embodiments herein may be particularly advantageous in limited size spaces, the embodiments are not limited by size unless explicitly stated otherwise. Further, the window embodiments herein can be advantageous in areas that traditionally house windows that have two positions, closed and vented. The vented position may provide air ingress without allow rain ingress and/or without causing wind buffeting at high speeds. Further, vehicle 100 is illustrated as an SUV, but it should be appreciated that the advantages of window 108 can be used in any vehicle. For example, vehicles with smaller rear passenger areas (e.g., trucks with smaller cabs, coupes) and vehicles with extended trunks or passenger spaces (e.g., minivans, station wagons) sometimes include a smaller rear window (which, in some cases, may be vented).

Figures 2A, 2B, 2C, 2D:
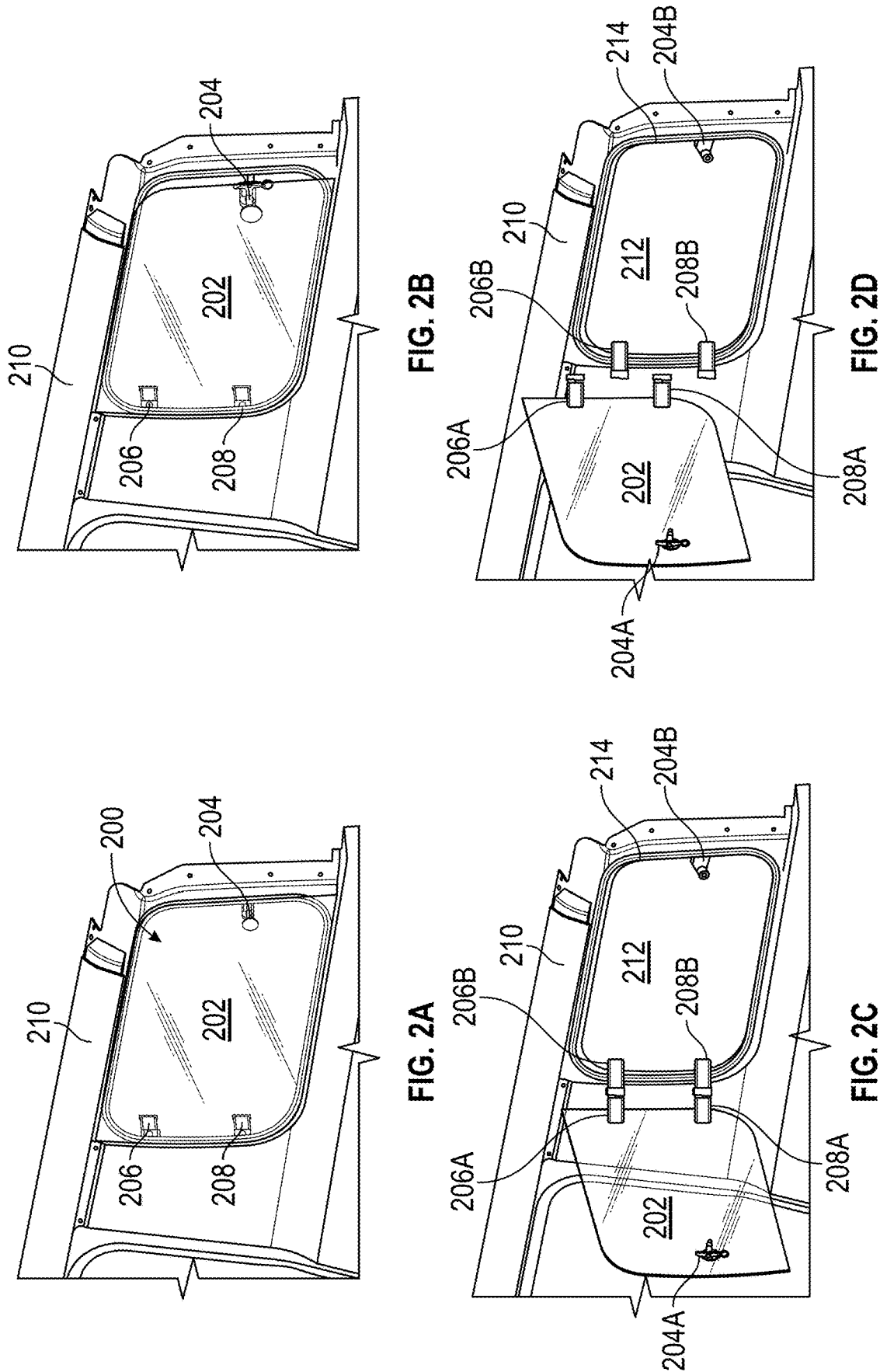
FIG. 2A illustrates a vehicle rear quarter-panel window assembly in a closed position.
FIG. 2B illustrates the rear quarter-panel window assembly in a vented position.
FIG. 2C illustrates the rear quarter-panel window assembly in an open position.
FIG. 2D illustrates the rear quarter-panel window assembly removed from the vehicle.

FIGS. 2A-2D illustrate a rear quarter-panel window assembly 200 in different positions: closed (FIG. 2A), vented (FIG. 2B), opened (FIG. 2C), and removed (FIG. 2D). Rear quarter-panel window assembly includes window pane 202, latch 204, and mounts 206 and 208. For ease of explanation, the body exterior is not shown in FIGS. 2A-2D and rear quarter-panel window assembly 200 is illustrated as removably coupled to vehicle frame 210. Vehicle frame 210 includes rear quarter-panel opening 212 (visible in FIGS. 2C and 2D).

FIG. 2A illustrates rear quarter-panel window assembly 200 in a closed position. In the closed position, window pane 202 occludes rear quarter-panel opening 212. In some embodiments, a window pane occupies an area of less than 0.5 square meters and a corresponding window assembly is configured to allow the window pane to occlude the opening and to fully open, thereby providing access to an interior of a corresponding vehicle. Window pane 202 is, in some embodiments, a glass pane, such as tempered glass or laminated safety glass. Other embodiments may use non-glass materials, such as a transparent thermoplastic (for example, polymethyl methacrylate, polyethylene terephthalate, polyvinyl chloride, polypropylene, polystyrene, polycarbonate, polyamide, polyethylene) and/or acrylic.

Window assembly 200 includes latch 204 coupled to window pane 202 and vehicle frame 210. In the closed position, latch 204 holds the window pane against vehicle frame 210 to occlude rear quarter-panel opening 212. Latch 204 includes a window-side latch component 204A and vehicle-side latch component 204B (shown in more detail in FIGS. 2C and 2D). In the closed position, latch components 204A and 204B are relatively positioned to seal rear quarter-panel opening 212. Latch component 204A is coupled to window pane 202 along a first edge of the pane. As used herein, coupling a window-side latch component to an edge of a window pane includes coupling the component sufficiently close to the edge of the window pane so that the window-side latch component can releasably couple to a vehicle-side latch component. Latch component 204A can be coupled to a window pane with any suitable technique, including adhesive coupling (e.g., gluing the latch to the window pane) or mechanical coupling (e.g., bolting the latch to the window pane). Latch 204 can be manufactured of any suitable material, including resilient plastic (e.g., nylon-6) so that it is shatter resistant. Window assembly 200 includes a single latch (latch 204) but could include additional latches to couple window pane 202 to vehicle frame 210. Although latch 204 is illustrated as a mechanical coupling, other coupling mechanism could be equivalently used (e.g., magnetic coupling).

Window assembly 200 includes mounts 206 and 208. Mounts 206 and 208 are rotatably coupled to window pane 202 and vehicle frame 210. As used herein, a mount is rotatably coupled to a window pane when the mount and window pane can be relatively rotated (when a portion of the mount is held stationary, the window pane can be rotated to various angles). Mounts 206 and 208 are shown in FIGS. 2A-D as each having two components (206A/206B and 208A/208B, respectively), but additional components are, in some embodiments, used to facilitate relative rotation of the window pane and a vehicle (as a non-limiting example, mount 400 in FIGS. 4A and 4B includes channel 410 in which a mount component moves to facilitate relative rotation of the window pane and the vehicle). Mounts 206 and 208 are coupled to window pane 202 along a second edge of pane 202, where the second edge is different from the edge to which latch 204 is attached. As used herein, coupling a mount component to an edge of a window pane includes coupling the component sufficiently close to the edge of the window pane so that the window pane can rotate relative to a vehicle. As depicted in FIGS. 2A-2D, the mount is attached to the window pane at a second edge that is opposite the edge to which latch 204 is attached. In other embodiments, the mount is attached to another edge (for example an edge that intersects the edge to which latch 204 is attached). Further, although two mounts are illustrated in FIGS. 2A-2D, other embodiments may include one mount or more than two mounts.

FIG. 2A depicts window assembly 200 in a closed position. In this position, the angle between the mount and the window pane is 0 degrees. The window assembly holds the window pane in the closed position under normal operating conditions, typically by fixing the latch in position, but other mechanisms could be used to fix the window pane in the closed position. In the closed position, latch 204 may be configured to hold window pane 202 against the window seal 214. When the window pane is vented or opened, the window pane is rotated from the closed position (e.g., vented 4 degrees or opened at least 45 degrees). In the closed position, window assembly 200 occludes rear quarter-panel opening 212. The window seal 214 (described more with respect to FIGS. 2C and 2D) may facilitate coupling of window pane 202 to vehicle frame 210.

FIG. 2B illustrates window assembly 200 in a vented position. In this position, the angle between the mount and the window pane is greater than 0 degrees but less than 45 degrees. In some embodiments, the window pane subtends an angle of between 4-10 degrees from the closed position. In some embodiments, the angle is 7 degrees. As shown in FIG. 2B, latch 204 releasably couples window pane 202 to vehicle frame 210. As used herein, releasably coupling a window pane to a vehicle includes fixedly coupling (e.g., adhesive, mechanical) a window-side latch component to the window pane, fixedly coupling (e.g., adhesive, mechanical) a vehicle-side latch component to the vehicle, and allowing for the window-side latch component to move relative to the vehicle-side latch component to thereby allow the window pane to move. In this vented position, latch 204 is configured to hold window pane 202 at an angle that is less than 45 degrees. In the embodiment of FIG. 2B, window assembly 200 holds window pane 202 in the vented position under normal operating conditions by fixing latch 204 in position, but other mechanisms could be used to fix the window pane in the vented position.

In some embodiments, latch 204 includes a motorized component. In such embodiments, a motorized latch may be operated locally (e.g., from a button in the vicinity of window assembly 200) or remotely from a user interface (e.g., a GUI in vehicle 100, a mobile phone app) to place the window assembly in the closed position, to place the window assembly in the vented position (e.g., by introducing movement between the window-side latch component and the vehicle-side latch component), or to place the window in the opened position (e.g., by releasing the window-side latch component and the vehicle-side latch component). Further, mounts 206 and 208 could also be motorized to facilitate movement of window pane 202 between window assembly 200's closed, vented, and opened positions. In embodiments with a motorized component (e.g., a motorized mount or a motorized latch), the motorization can be controlled by an ECU (e.g., Body Control Module (BCM) ECU, Door Control Module (DCM) ECU).

FIG. 2C illustrates rear quarter-panel window assembly 200 in an open position. In the open position, window pane 202 has been rotated at least 45 degrees from the closed position. Accordingly, the angle between window pane 202 and a portion of mounts 206 and 208 is also at least 45 degrees. In this position, a user may advantageously access an interior of the rear of the vehicle without opening a vehicle door. As shown in FIG. 2C, window pane 202 is rotated 90 degrees. In some embodiments, a window pane rotates at least 90 degrees from the closed position to the open position. As illustrated in FIG. 2C, rear quarter-panel opening 212 is surrounded by a window seal 214 (e.g., a gasket manufactured from, e.g., rubber or synthetic rubber, such as neoprene, nitrile (Buna-N), ethylene propylene diene monomer, silicone rubber, and styrene butadiene rubber) that facilitates sealing of window assembly 200 in the closed position.

As shown in FIG. 2C, mounts 206 and 208 are separable into a window-side mount component (206A and 208A, respectively) and a vehicle-side mount component (206B and 208B, respectively). Window-side and vehicle-side mount components can be coupled to a window pane or vehicle with any suitable technique, including adhesive coupling (e.g., gluing the mount component to the window pane or vehicle) or mechanical coupling (e.g., bolting the mount component to the window pane or vehicle). Although mounts 206 and 208 are each illustrated as separable into two components, each may have additional components (for example, as described below with respect to mount 400 in FIGS. 4A and 4B).

FIG. 2D illustrates rear quarter-panel window assembly 200 with window panel 202 removed from the vehicle. In the embodiment of window assembly 200, the window panel is removed from the vehicle by decoupling the first mount component (window-side mount components 206A and 208A) from the second mount component (vehicle-side mount components 206B and 208B). In the embodiment of FIG. 2D, window pane 202 is lifted up to remove the pane from the vehicle. Other embodiments may release the window pane in different ways. For example, additional features may prevent unintentional removal of window pane 202. In such embodiments, a mechanical detent, a release button, or an electronically activated release may be included to prevent unintentional removal of the pane.

Removal of window pane 202 may advantageously allow unrestricted access to the rear of the vehicle without risk of damaging window pane 202 when a user accesses the vehicle. In this way, a user need not be wary of the window pane when inserting or removing items from the rear vehicle. As a further exemplary advantage, removal of the rear-quarter glass while driving can simulate an open vehicle driving experience, similar to a convertible with the cover down. In some embodiments, the vehicle-side mount components are flush with the body of the vehicle when window pane 202 is removed. In such embodiments, the vehicle-side mounts do not protrude from the body of the vehicle. This may advantageously improve aerodynamics and/or aesthetics, and may reduce theft risk.

In some embodiments, vehicle-side mount components may provide additional functions when window pane 202 is removed. For example, the vehicle-side mount component may be coupled with a third mount on an accessory. A rack or other adventure product holder can be inserted into the vehicle-side component and used, for example, to hang a wet suit or scuba equipment. In another example, a shower assembly (e.g., a solar bag with shower head) may be inserted into the vehicle-side mount component. Other examples of mountable accessories include tool boxes, medical kits, and a ladder (to provide roof access, for example). In some embodiments, the vehicle-side mount components include a power connection. This may facilitate rotation of the window pane between the window assembly's positions (as described earlier), but may also be used to actuate or power accessories that are coupled to the vehicle-side mount components when window pane 202 is removed. For example, a pump can be attached to the power connection and used for, e.g., showering. In other examples, a speaker, a display, cooking equipment, or lighting could be coupled to the vehicle-side mount component's power connection. In yet another example, an awning could be coupled (at least in part) to the vehicle-side mount components, where a power connection could automate extension of the awning. The power connection could include a battery source or hard wiring to the vehicle. The power connection may also include the ability to pair the vehicle-side mount component with vehicle ECUs and/or a user's electronic device.

In some embodiments, window assembly 200 may be configured to rotate window pane 202 to other positions. For example, window assembly 200 may be in a vented position with window pane 202 at an angle that is less than 45 degrees and different from the angle described above with respect to the vented position of FIG. 2B. In such embodiments, latch 204 may be further configured to hold window pane 202 in this vented position that is different than the vented position described above with respect to FIG. 2B.

Figure 3A:
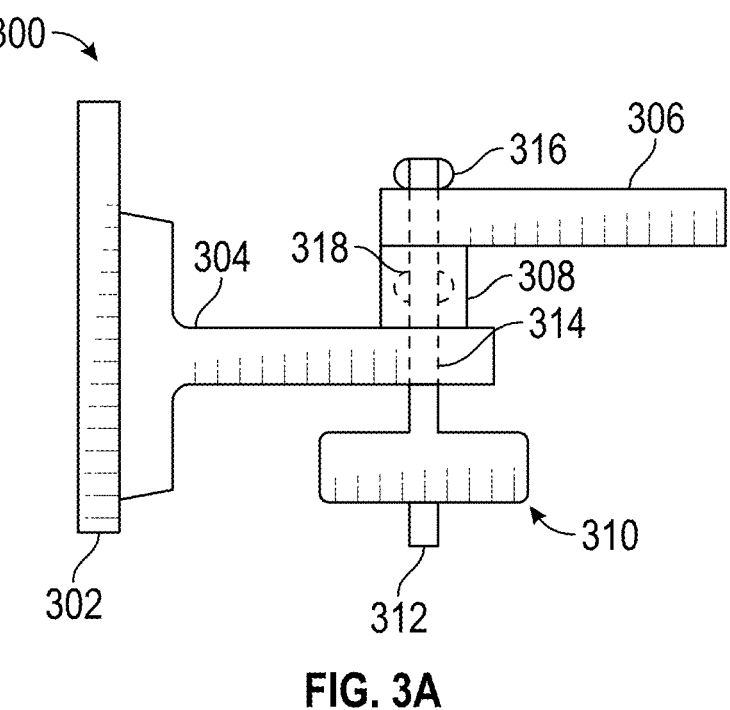
FIGS. 3A and 3B illustrate an exemplary latch for releasably coupling a vehicle rear quarter-panel window assembly to a vehicle.
Figure 3B:
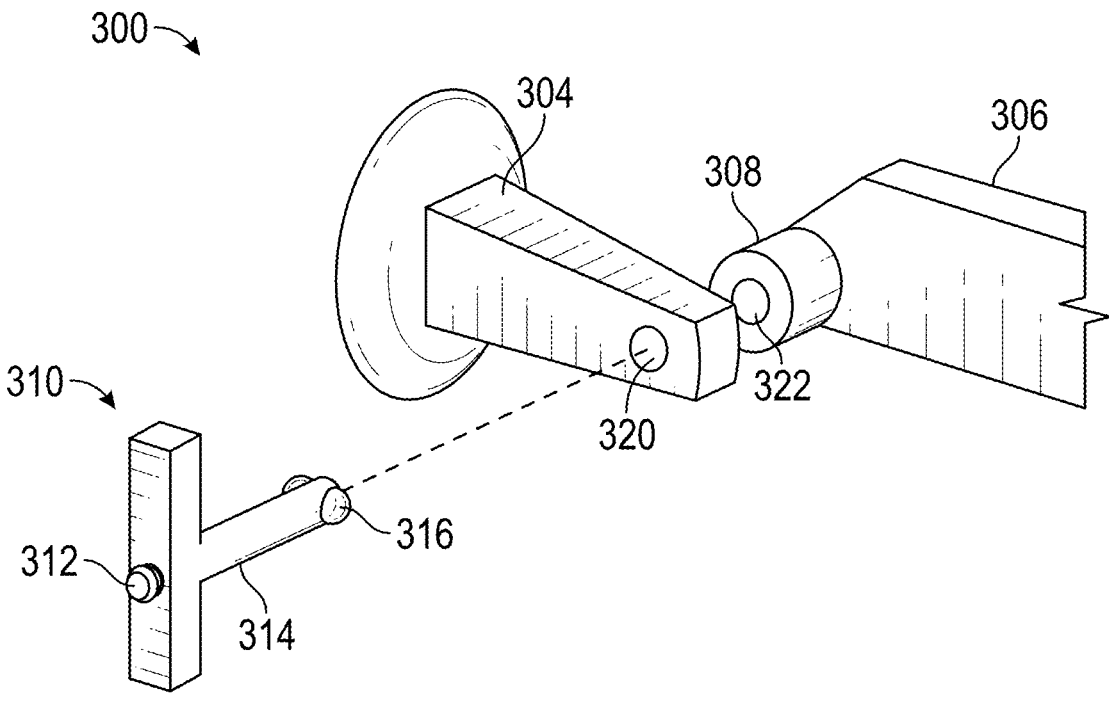

FIGS. 3A and 3B illustrate an exemplary latch 300 for releasably coupling a window pane of a vehicle rear quarter-panel window assembly to a vehicle. In some embodiments, latch 300 is latch 204 described above with respect to FIGS. 2A-2D. Latch 300 includes window-side latch components 304 and 310 coupled to window pane 302. As discussed above, the window-side latch components can be coupled to window pane 302 through any suitable means. Latch component 310 is a pin-plug which can be inserted through bore 302 in latch component 304 and through bore 322 in vehicle-side latch components 306 and 308. Latch component 310 includes a push-button 312, a shaft 314, and detents 316. Shaft 314 is inserted through bore 320 and 322. The detents 316 fix latch 300 in various positions. In FIG. 3A, detents 316 protrude from shaft 314 beyond vehicle-side component 306, thereby fixing latch 300 (and a corresponding window assembly) in a closed position. To release latch 300 (and the corresponding window assembly), a user presses push-button 312 which retracts detents 316 into shaft 314. The user can then pull the shaft through bore 322. If the user wishes to fix latch 300 (and the corresponding window assembly) in a vented position, the user releases push-button 312 at cavities 318 in bore 322. The detents protrude from shaft 314 and latch 300 is held in position by interaction of detents 316 with cavities 318. A user may also decouple the window-side latch component from the vehicle-side latch component by depressing release button 312 until shaft 314 and detents 316 are removed from bore 322. As shown in FIG. 3B, this can include removing shaft 314 from both bore 320 and bore 322, but removal of shaft 314 from bore 322 is needed to move the window assembly to the open position and so some embodiments may prevent full removal of 310 from bore 320 of component 304.

Figure 4A:
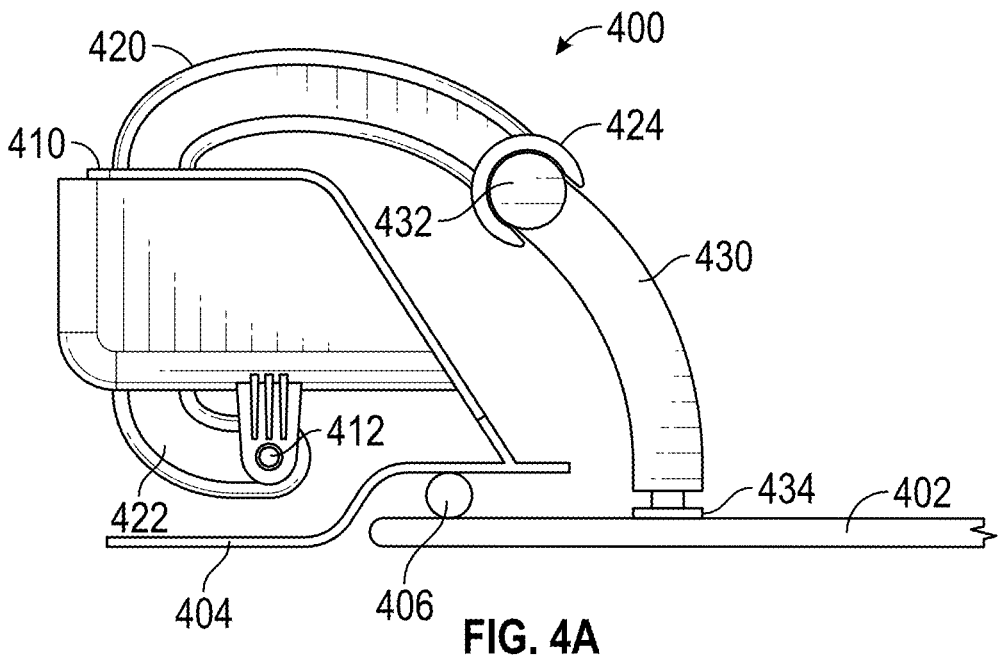
FIGS. 4A-4C illustrate an exemplary mount removably coupling a vehicle rear quarter-panel window assembly to a vehicle.
Figure 4B:
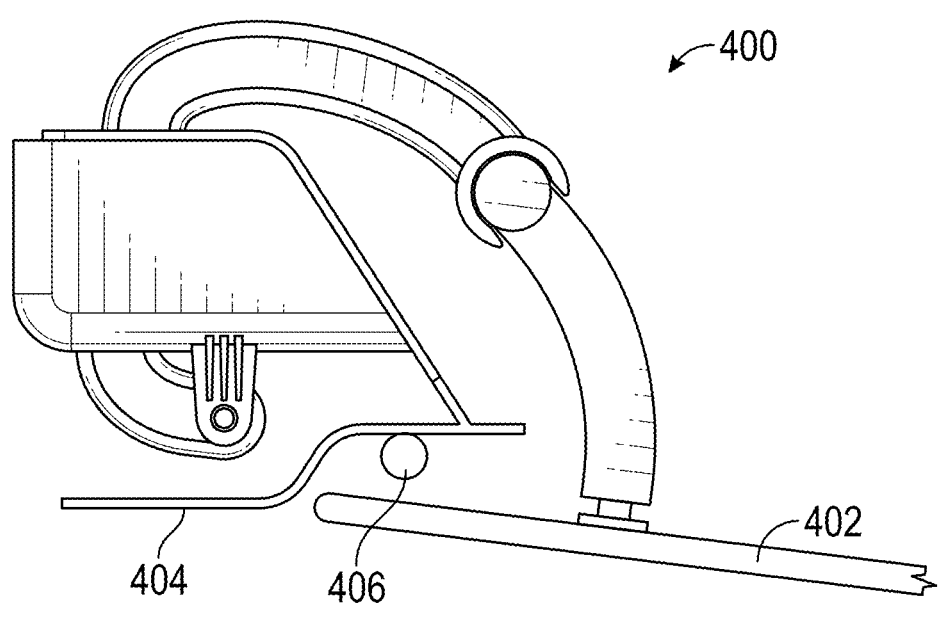
Figure 4C:
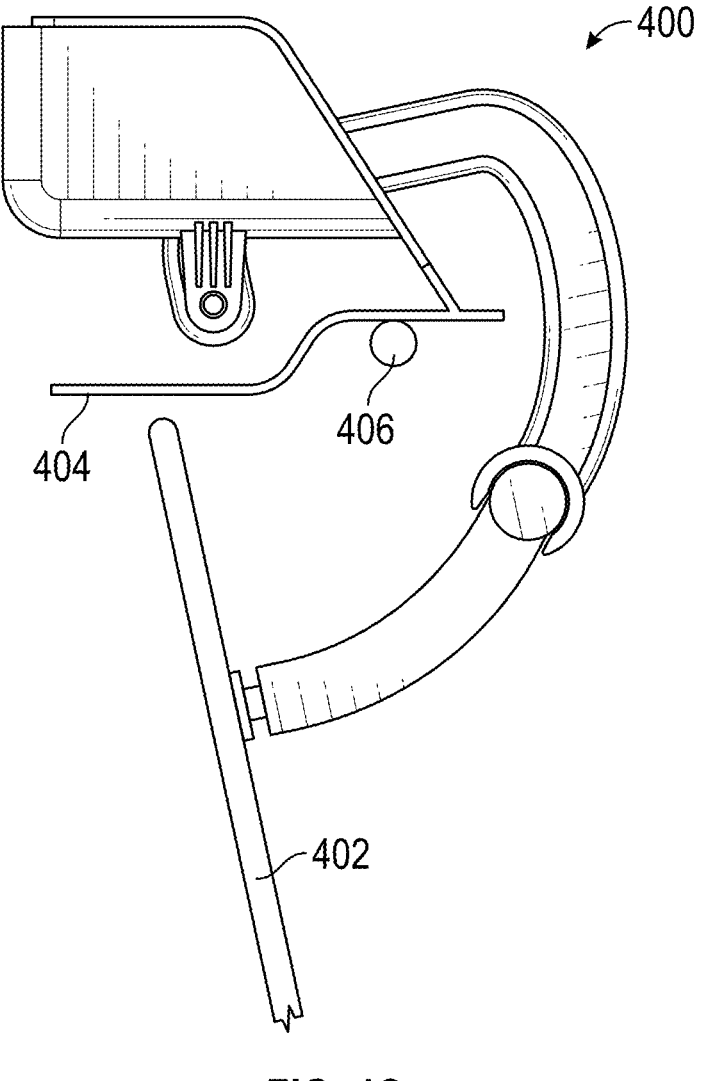

FIGS. 4A-4C illustrate an exemplary mount 400 for removably coupling a window pane of a vehicle rear quarter-panel window assembly to a vehicle. In some embodiments, mount 400 is mount 206 or mount 208 described above with respect to FIGS. 2A-2D. Mount 400 is an exemplary gooseneck hinge that facilitates movement of window pane 402 from a closed position (FIG. 4A), to a vented position (FIG. 4B), and to an open position (FIG. 4C). Between the closed and open positions, window pane 402 has rotated at least 45 degrees. Mount 400 includes housing 410, lower gooseneck hinge 420, and upper gooseneck hinge 430. Housing 410 is configured to be coupled into a vehicle frame so that mount 400 is held stationary relative to the vehicle frame when the lower 420 and upper 430 gooseneck hinges are moved. Lower gooseneck hinge 420 is coupled at one end 422 to a housing 410 at connection point 412. In some embodiments, the lower gooseneck hinge 420 is coupled to the housing 410 with a spring to aid movement of the window pane 402. Lower gooseneck hinge 420 is coupled at its other end 424 to an end 432 of upper gooseneck hinge 430. In some embodiments, upper gooseneck hinge 430 is separable from lower gooseneck hinge 420 so that window pane 402 can be removed from the vehicle. Upper gooseneck hinge 430 is connected at its other end 434 to window pane 402. In FIG. 4A, mount 400 holds window pane 402 in its closed position. Window pane 402 is pressed against seal 406 on vehicle frame 404. In FIG. 4B, window pane 402 has been moved to a vented position. In FIG. 4C, window pane 402 has been moved to an open position. Between the closed and open positions, window pane 402 subtends an angle of greater than 45 degrees.

Figure 5:
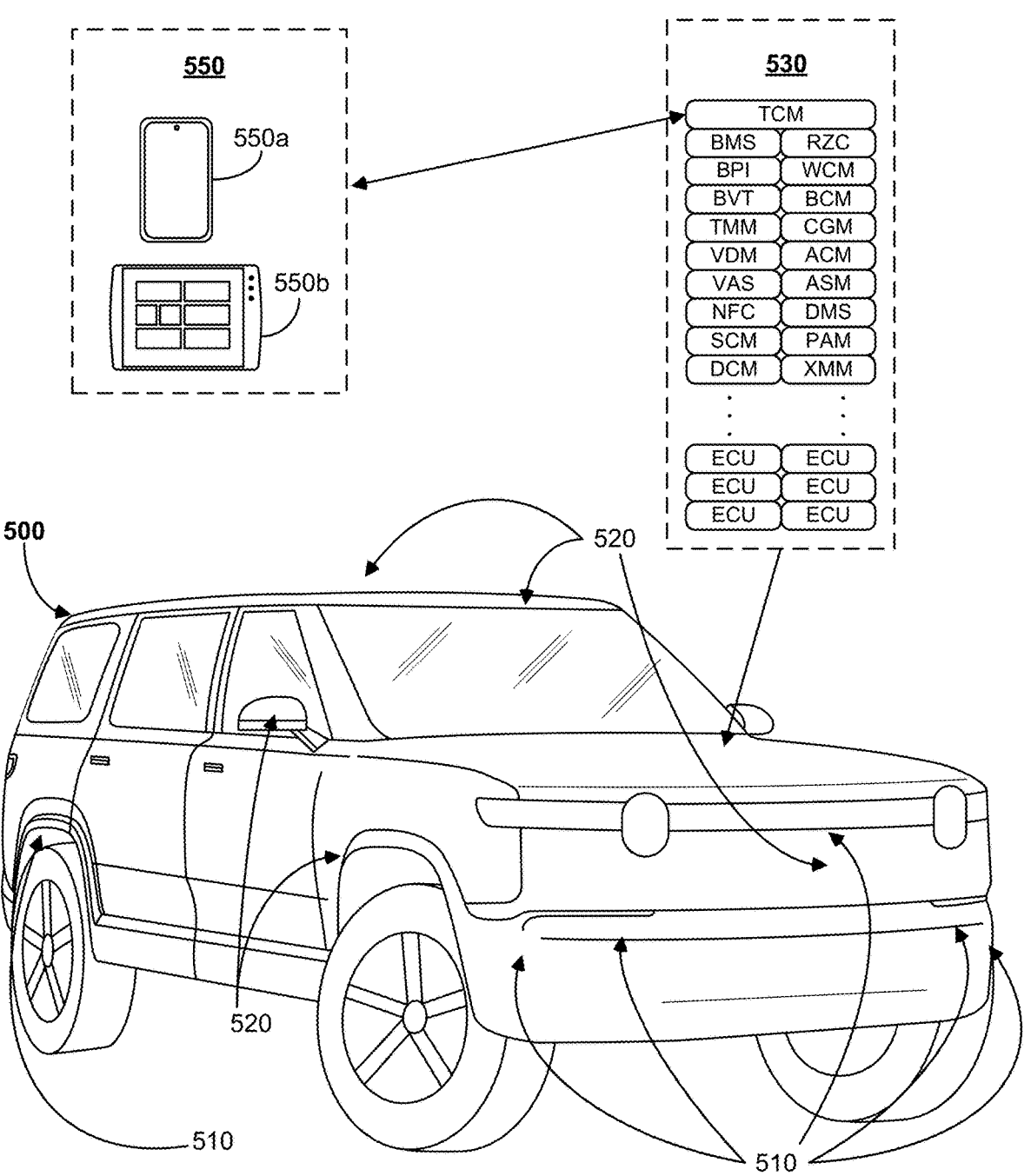
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550*a*, tablet computing device 550*b*, or a smart vehicle accessory). As an example and not by way of limitation, a sensor 510 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enables control of various systems on-board the vehicle. As shown in FIG. 5, control system 530 may comprise one or more electronic control units (ECUs), each of which are dedicated to a specific set of functions. Each ECU may be a computer system (as described further in FIG. 6), and each ECU may include functionality provide by one or more of the example ECUs described below.

Features of embodiments as described herein may be controlled by one or more ECUs that provide functionality related to the battery pack of the vehicle. A Battery Management System (BMS) ECU may control and monitor a number of different aspects related to the electric vehicle battery system. Functions that may be controlled by the BMS may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with the BPI and BVT ECUs, and calculate state-of-charge (SoC) and battery state-of-health (SoH). A Battery Power Isolation (BPI) ECU may provide high-voltage sensing, measure the battery pack current, and facilitate determination of pack isolation. A Balancing Voltage Temperature (BVT) ECU may monitor battery module cell voltages, monitor temperature, and execute cell balancing.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by one or more ECUs that provide functionality to control interior cabin components of the vehicle. A DCM ECU may provide functionality to sense outside ambient temperature or to control one or more components of a door of the vehicle, such as, by way of example and not limitation: window glass (e.g., moving the glass up or down), door locks, door handles (e.g., automatically moving in or out to facilitate grasping the handle), lamp(s), side mirror(s) (e.g., up, down, in, out, fold, unfold), mirror heater(s), electrochromatic mirror dimmers, turn signals, approach lighting, spotlight(s), blind spot monitor lamp(s), or window switch lamp(s).

Features of embodiments as described herein may be controlled by a rear ECU. The rear ECU may provide functionality to control different body components, such as, by way of example and not limitation, a license plate lamp, based on vehicle body type. For vehicles with a truck bed, the rear ECU may provide functionality to control a tonneau cover, sidebin latch, tailgate latch, sidebin lights, or cargo lamps. For a sport utility-type vehicle with a rear door, the rear ECU may provide functionality to control liftgate latches, a liftgate actuator, puddle lamps, or a rear wiper. For vehicles with a tow hitch, the rear ECU may provide functionality to control trailer braking or a trailer brake stop light. For vehicles with a third row of seats, the rear ECU may provide functionality to control movement of interior components to facilitate easy entry to the rear seats. For a delivery vehicle, the rear ECU may provide functionality to control movement of a bulkhead door motor and latches, rollup door latches, various lamps, rear stop lights, and turn lights.

Features of embodiments as described herein may be controlled by a BCM ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a User Interface (UI) ECU may generate a user interface displayed on a dashboard of the vehicle. The user interface may display information and provide audio output for an infotainment system, including various views around and inside the vehicle. UI may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by UI may enable interaction with other modules of control system 530.

Vehicle 500 may include one or more additional ECUs, such as, by way of example and not limitation: a Central Gateway Module (CGM) ECU, a Vehicle Dynamics Module (VDM) ECU, a Seat Control Module (SCM) ECU, an Autonomy Control Module (ACM) ECU, an Autonomous Safety Module (ASM) ECU, a Driver Monitoring System (DMS) ECU, and/or a Winch Control Module (WCM) ECU. If vehicle 500 is an electric vehicle, one or more ECUs may provide functionality related to the battery pack of the vehicle, such as a Thermal Management Module (TMM) ECU.

Figures 6A, 6B:
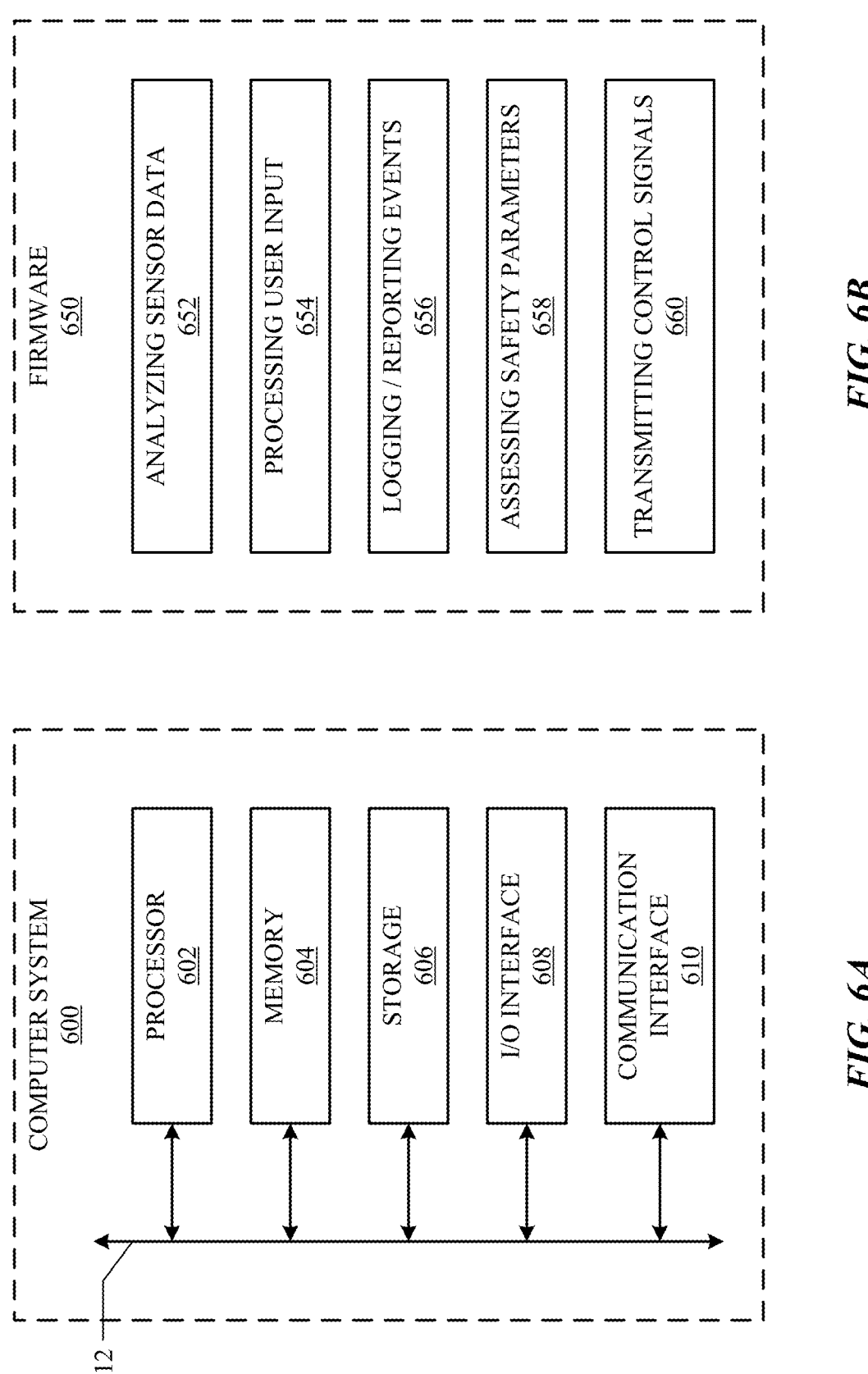
FIG. 6A is a schematic of an example computer system.
FIG. 6B illustrates example firmware for a vehicle ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed, span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 (e.g., compute units &22 and &32) may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units &24 and &34). Processor 602 may include one or more internal caches for data, instructions, or addresses.

In particular embodiments, memory 604 includes main memory for storing instructions for processor 602 to execute or data for processor 602 to operate on. In particular embodiments, one or more memory management units (MMUs) reside between processor 602 and memory 604 and facilitate accesses to memory 604 requested by processor 602. In particular embodiments, memory 604 includes random access memory (RAM). This disclosure contemplates any suitable RAM.

In particular embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In particular embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In particular embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. It should also be understood that as used in the description herein and throughout the claims that follow, the meaning of "a," "an," and "the" includes "one" and "more than one" unless the context clearly dictates otherwise.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A vehicle window assembly, the assembly comprising:
   a window pane moveable to a closed position, a vented position, and an open position;
   a window seal;
   a latch releasably coupled to a first edge of the window pane; and
   a mount rotatably coupled to a second edge of the window pane, wherein:

the mount comprises a gooseneck hinge comprising two gooseneck elements;
   in the open position;
      the latch is released from the window pane;
      the mount is configured to support the window pane;
      the mount and the window pane are relatively rotatable to a first angle, the first angle at least 45 degrees; and
      the two gooseneck elements are separable to enable the window pane to be removed;
   in the vented position, the latch is configured to hold the window pane at a second angle less than 45 degrees; and
   in the closed position, the latch is configured to hold the window pane against the window seal.

2. The vehicle window assembly of claim 1, wherein, in the vented position, the latch is further configured to hold the window pane at a third angle less than 45 degrees.

3. The vehicle window assembly of claim 1, wherein a first gooseneck element of the two gooseneck elements is attachable to the window pane and a second gooseneck element of the two gooseneck elements is attachable to a vehicle.

4. The vehicle window assembly of claim 3, wherein the mount is configured to decouple from the vehicle by decoupling the first gooseneck element of the two gooseneck elements from the second gooseneck element of the two gooseneck elements.

5. The vehicle window assembly of claim 3, wherein the second gooseneck element of the two gooseneck elements comprises a power connection.

6. The vehicle window assembly of claim 1, wherein the window assembly is configured to occlude a quarter-panel opening.

7. The vehicle window assembly of claim 1, wherein the window pane occupies an area less than 0.5 square meters.

8. A vehicle comprising
   a quarter-panel opening;
   a window pane selectively covering the quarter-panel opening;
   a latch comprising a first latch component and a second latch component, wherein:
      the first latch component is coupled to a first edge of the window pane;
      the second latch component is coupled to a first edge of the quarter-panel opening; and
      the latch releasably couples the window pane to the vehicle; and
   a mount rotatably coupled to a second edge of the window pane and to a second edge of the quarter-panel opening, wherein:
      the mount comprises a gooseneck hinge comprising two gooseneck elements;
      when the first latch component is released from the second latch component, the first edge of the window pane is released from the vehicle and the mount is configured to support the window pane;
      the mount is coupled to the vehicle and the window pane so that the window pane is rotatable relative to the vehicle by at least 45 degrees; and
      the two gooseneck elements are separable to enable the window pane to be removed.

9. The vehicle of claim 8, wherein the mount and the latch couple the window pane to the vehicle in a closed position and a vented position, wherein, in the vented position, the latch holds the window pane at an angle to the vehicle, and wherein the angle is less than 45 degrees.

10. The vehicle of claim 8, wherein a first gooseneck element of the two gooseneck elements is attachable to the window pane and a second gooseneck element of the two gooseneck elements is attachable to the vehicle.

11. The vehicle of claim 10, wherein the mount is configured to decouple from the vehicle by decoupling the first gooseneck element of the two gooseneck elements from the second gooseneck element of the two gooseneck elements.

12. The vehicle of claim 11, wherein the second gooseneck element is configured to couple with a third mount component attached to a vehicle accessory.

13. The vehicle of claim 10, wherein the second gooseneck element of the two gooseneck elements comprises a power connection.

14. The vehicle of claim 8, wherein the quarter-panel opening is positioned above a rear wheel of the vehicle.

15. A vehicle comprising
a quarter-panel opening;
a window pane selectively covering the quarter-panel opening;
a latch releasably coupled to a first edge of the window pane;
a mount coupling a second edge of the window pane to the vehicle so that the window pane is rotatable relative to the vehicle, wherein;
the mount comprises a gooseneck hinge comprising two gooseneck elements;
when the latch is released from the window pane, the mount is configured to support the window pane; and the two gooseneck elements are separable to enable the window pane to be removed from the vehicle; and
a power connection in the mount.

16. The vehicle of claim 15, wherein the window pane is moveable to a closed position, a vented position, and an open position, wherein
in the vented position, the window pane is held at an angle to the vehicle of less than 45 degrees, and wherein
in the open position, the window pane is rotated at an angle to the vehicle of at least 45 degrees.

17. The vehicle of claim 16, wherein
a first gooseneck element of the two gooseneck elements is attached to the window pane and a second gooseneck element of the two gooseneck elements is attached to the vehicle; and
the second gooseneck element comprises the power connection.

18. The vehicle window assembly of claim 3, wherein the second gooseneck element of the two gooseneck elements is coupled to the vehicle with a spring.

19. The vehicle window assembly of claim 3, wherein the second gooseneck element is configured to couple with a third mount component attached to a vehicle accessory.

20. The vehicle of claim 10, wherein the second gooseneck element of the two gooseneck elements is coupled to the vehicle with a spring.

* * * * *